(12) United States Patent
Chow (10) Patent No.: US 7,315,692 B2
(45) Date of Patent: Jan. 1, 2008

(54) ELECTRICAL WATER HEATER

(76) Inventor: Hung Chow, Huangpuhongtian Industrial Zone, Shajing, Baoan District, Shenzhen, Guangdong province (CN)

( * ) Notice: Subject to any disclaimer, the term of this patent is extended or adjusted under 35 U.S.C. 154(b) by 281 days.

(21) Appl. No.: 11/118,238

(22) Filed: Apr. 29, 2005

(65) Prior Publication Data

US 2006/0243272 A1    Nov. 2, 2006

(51) Int. Cl.
*F24H 1/20* (2006.01)
(52) U.S. Cl. .................................. 392/455; 392/441
(58) Field of Classification Search ............ None
See application file for complete search history.

(56) References Cited

U.S. PATENT DOCUMENTS

| | | | | |
|---|---|---|---|---|
| 3,781,521 | A * | 12/1973 | Kircher | 219/442 |
| 3,784,788 | A * | 1/1974 | Fourny | 219/441 |
| 4,310,748 | A * | 1/1982 | Paulin | 219/437 |
| 4,441,016 | A * | 4/1984 | Oota et al. | 219/441 |
| 4,544,830 | A * | 10/1985 | Miller | 392/447 |
| 4,558,204 | A * | 12/1985 | Bleckmann | 392/467 |
| 4,645,910 | A * | 2/1987 | Chhatwal | 219/437 |
| 4,730,099 | A * | 3/1988 | Bleckman | 392/447 |
| 5,908,570 | A * | 6/1999 | Deliens | 219/439 |
| 5,957,723 | A * | 9/1999 | Gort-Barten | 439/568 |
| 6,118,102 | A * | 9/2000 | Slegt | 219/438 |
| 6,178,290 | B1 * | 1/2001 | Weyrauch et al. | 392/445 |
| 6,377,750 | B1 * | 4/2002 | Scott et al. | 392/441 |
| 6,431,058 | B1 * | 8/2002 | Binot et al. | 99/331 |
| 6,919,540 | B2 * | 7/2005 | Kaastra | 219/441 |
| 2005/0284861 | A1 * | 12/2005 | Fung | 219/427 |
| 2006/0096974 | A1 * | 5/2006 | Gaulard | 219/450.1 |
| 2007/0000906 | A1 * | 1/2007 | Kaastra | 219/441 |

* cited by examiner

*Primary Examiner*—Thor S. Campbell
(74) *Attorney, Agent, or Firm*—Raymond Y. Chan; David and Raymond Patent Group (57) ABSTRACT

The present invention discloses an electrical water heater including a container body which is adapted to contain a predetermined volume of water, a heating unit mounted to the heater body for heating the water, and a temperature control unit for operating the heating unit to heat the water. The temperature control unit includes a temperature adjuster for setting a heat-up temperature of the water, a thermal sensor for instantly monitoring a temperature of the water, a controlling circuit electrically coupled to the thermal sensor and the temperature adjustor for comparing the heat-up temperature and the temperature, whenever the temperature and the heat-up temperature are not matched, the controlling circuit is capable of outputting an operative signal to heating unit to manage a heating process.

20 Claims, 6 Drawing Sheets

ELECTRICAL WATER HEATER

BACKGROUND OF THE PRESENT INVENTION

1. Field of Invention

The present invention relates to electric appliance, and more particularly, relates to an electrical water heater equipped with temperature control unit, by which a user is able to selectively and purposely setting the heating temperature of the water reserved in the heater.

2. Description of Related Arts

Commonly, an electrical water heater comprise a temperature control unit, through which a predetermined temperature, 100° C., is set in advance, so that when the water reserved in the vessel of the water boiler reach such predetermined temperature, the temperature control unit would automatically switch off electricity power for terminating the heating process. However, in routine practices, some warm or lukewarm water would be required under some circumstances, rather than 100° C. boiling water. Obviously, the conventional water boilers were unpractical for providing such temperature adjusting function. Unfortunately, user had to be patient and waiting for the boiled water gradually cooled down to meet their requirements. Needless to say, considerable energy had been wasted in such heating process. It is highly desirable to develop a water heater including an adjustable temperature control unit so that user could freely and deliberately set an optimal temperature of the water.

SUMMARY OF THE PRESENT INVENTION

A primary object of the present invention is to provide an electrical water heater having an adjustable temperature control unit, so that user could freely and deliberately set a predetermined heating temperature.

Another object of the present invention is to provide an electrical water heater having an adjustable temperature control unit, wherein once the predetermined temperature is reached during heating process, the water temperature could be maintained.

Another object of the present invention is to provide an electrical water heater having an adjustable temperature control unit, wherein no complicated parts are required to achieve aforementioned objects.

Accordingly, to achieve above mentioned objects, the present invention provides an electrical water heater, comprising:

a water container comprising a container body having a water cavity for containing a predetermined volume of water, and a container base supporting the container body thereon;

a water heater unit which comprises an electrical heating element mounted on the container base for heating up the water within the water cavity of the container body; and a temperature control unit, which is electrically connected to the water heater unit for maintaining the water within the water cavity at a desired heat-up temperature, comprising:

a thermal sensor mounted on the container base for monitoring a water temperature of the water within the water cavity; and a temperature controller, which is received in the container base, comprising a controlling circuit electrically connected to the thermal sensor and a temperature adjuster electrically connected to the controlling circuit for presetting the heat-up temperature, wherein when the water temperature detected by the thermal sensor is below said heat-up temperature, the controlling circuit is activated to operate the heating element for heating up the water until the water temperature reaches the heat-up temperature, and when the water temperature detected by the thermal sensor is above the heat-up temperature, the controlling circuit is activated to switch off the water heater unit so as to keep the water within the water cavity at the heat-up temperature.

These and other objectives, features, and advantages of the present invention will become apparent from the following detailed description, the accompanying drawings, and the appended claims.

DETAILED DESCRIPTION OF THE PREFERRED EMBODIMENT

Referring to FIG. 1 to FIG. 4, an electrical water heater 1 according to the preferred embodiment of the present invention is illustrated. The electrical water heater 1 comprises a container body 10 having a water cavity 11 for containing a predetermined volume of water, a container base 12 supporting the container body 10 thereon, and a water heater unit 20 which comprises an electrical heating element 21 mounted on the container base 12 for heating up the water within the water cavity of the container body 10.

Furthermore, the electrical water heater 1 comprises a temperature control unit 30, which is electrically connected to the water heater unit 20 for maintaining the water within the water cavity 11 at a desired heat-up temperature, the temperature control unit 30 comprises a thermal sensor 31 mounted on the container base 12 for monitoring a water temperature of the water within the water cavity 11, and a temperature controller 32, which is received in the container base 12, wherein the temperature controller comprises a controlling circuit 321 electrically connected to the thermal sensor 31 and a temperature adjuster 322 electrically connected to the controlling circuit 321 for presetting the heat-up temperature, wherein when the water temperature detected by the thermal sensor 31 is below said heat-up temperature, the controlling circuit 321 is activated to operate the electrical heating element 21 for heating up the water until the water temperature reaches the heat-up temperature, and when the water temperature detected by the thermal sensor 31 is above the heat-up temperature, the controlling circuit 321 is activated to switch off the electrical heating element 21 so as to keep the water within the water cavity 11 at the heat-up temperature.

Figure 4:
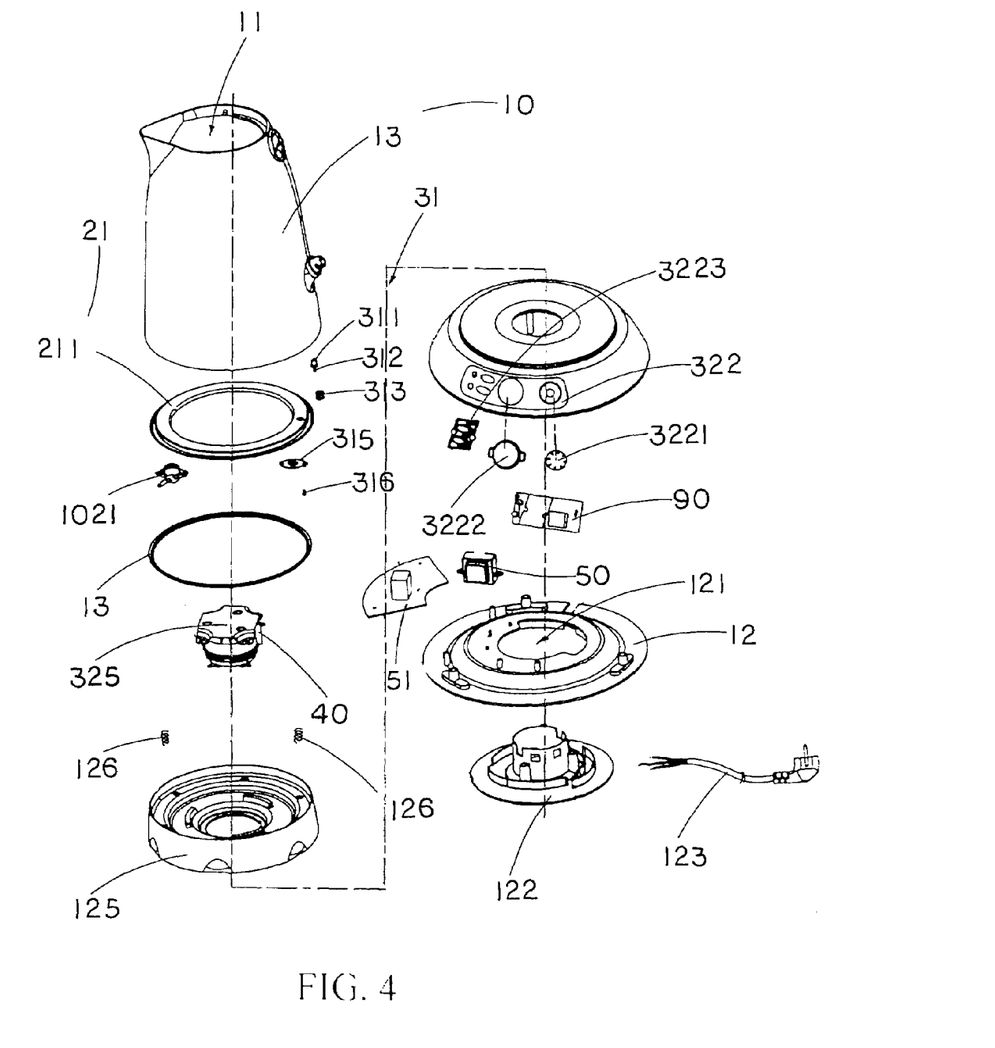
FIG. 4 is an exploded perspective view of the electrical water heater according to the above preferred embodiment of the present invention.

In the present invention, the container body 10 is embodied as a conventional vessel having a bottom wall 101 and a surrounding wall 102 upwardly extended from the bottom wall 101 to define the water cavity 11 for containing the water. The container body 10 further has a bottom edge 104 downwardly and outwardly extended from the surrounding wall 102 to form a base cavity 105 for receiving the water heater unit 20. In the preferred embodiment of the present invention, the water heater unit 20 is received within the base cavity 105, so that the heating unit 20 is invisible from outside nor exposed to the user thus preventing any accidental injury or scalding. As shown in FIG. 4, the container body 10 further comprises a bottom cover 12 for enclosing the base cavity 105. It is noted that a sealing gasket 13 is provided for isolating the water heater unit 20 from the container body 10 so as to ensure the heat generated from the water heater unit 20 will be fully utilized onto the bottom wall 101 of the container body 10 for heating the water 2 contained within the reserving cavity 103.

Figure 1:
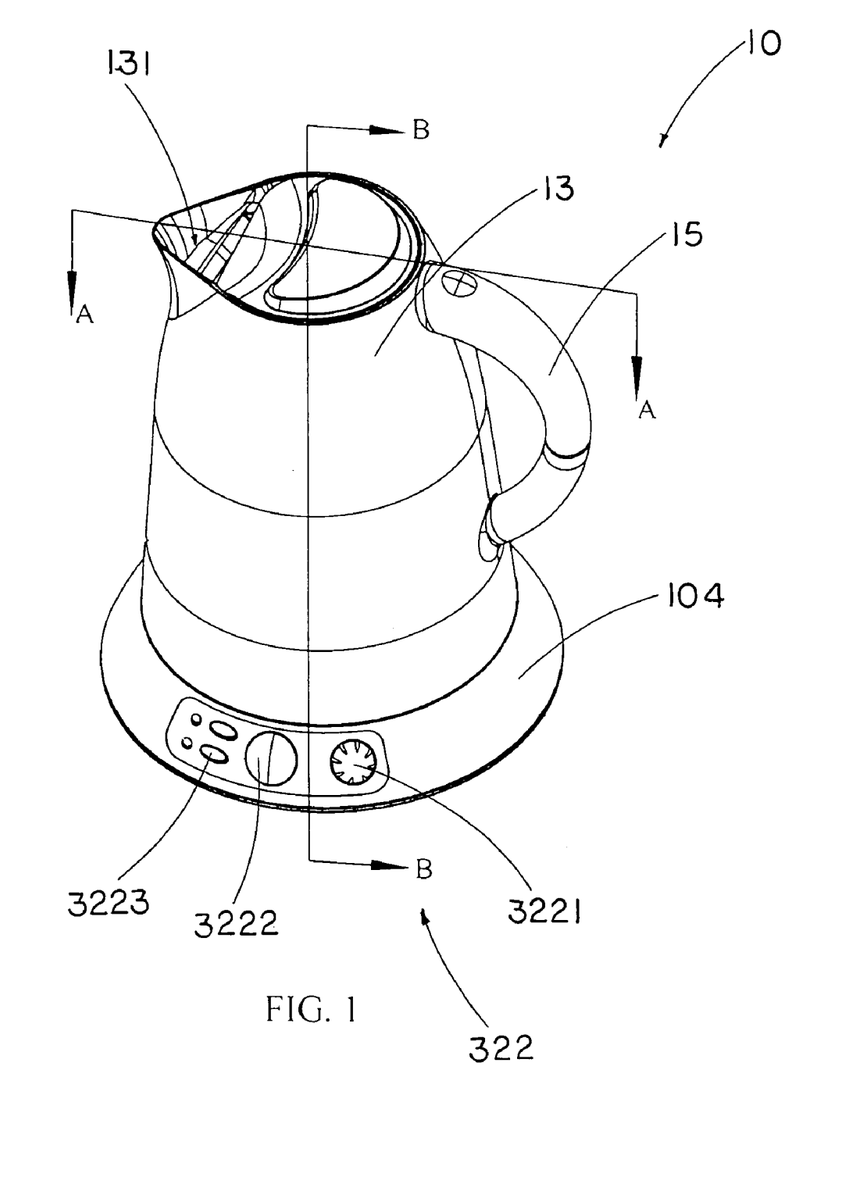
FIG. 1 is a perspective view of an electrical water heater according to the preferred embodiment of the present invention.

As shown in FIG. 1, the water container 10 further comprises an outer insulating casing 13 integrally extended from the container base 12 to sealedly enclose the container body 10 in a heat insulating manner, wherein the insulating casing 13 has a top opening 131 communicating with the water cavity 11 and a water filter 14 is provided at the top opening 131 for filtering the water to be heated within the water cavity 11. At the same time, for user's convenient handling, the electrical water heater of the present invention further comprises a handle 15 integrally projected from the insulating casing 13. Through the handle 15, a user is able to easily tilt the container body 10 to pour the heat-up water out for purposes.

Moreover, the thermal sensor 31 is disposed within the reserving cavity 103 and embedded onto the bottom wall 101 of the container body 10 for instantly monitoring the temperature of the water. Here, the thermal sensor 31 is a kind of water immersible thermal sensor having a sensor probe 311, having a thermal resistor, exposed into the water 11 for detecting the temperature of the water and a sensor body 312 penetrating the bottom 101 in a water tight manner. What is more, the thermal sensor 31 is a thermistor having a variable resistance subjected to be changed corresponding to the water temperature such that the controlling circuit 321 could read the variable resistance of the thermal sensor 31 to activate the water heater element 20.

Preferably, the electrical heating element 21 comprises an electro-thermal plate 211 sealedly mounted between the container base 12 and a bottom wall 101 of the container body 10 which is made of thermal conductive material, such that when the electro-thermal plate 211 is activated by the controlling circuit 321, the electro-thermal plate 211 is capable of generating heat through the bottom wall 101 of the container body 10 for heating up the water within the water cavity 11. Moreover, the thermal sensor 31 is mounted onto the heating unit electro-thermal plate 211, and a sensor gasket 313 is provided for thermally separating the thermal sensor 31 and the heating element 21. As shown in FIG. 4, the thermal sensor 31 is mounted to the electro-thermal plate 211 via a rivet panel 315 wherein the thermal sensor body 312 is attached onto the rivet panel 315 and a screw 316 is provided for securely affixing the rivet panel 315 onto the electro-thermal plate 211. It is noted that the electro-thermal plate 211 is resiliently affixed to a base supporter 125 of the container body 10 via a pair of springs 126, wherein the base supporter 125 is received within the base cavity 105 for securely sustaining the electrical heating element 21 biasing against the bottom wall 101.

According to the preferred embodiment of the present invention, the controlling circuit 321 comprises a central processor unit CPU 101, a transformer circuit 99 adapted for electrically connecting with an external AC power supply 98 to convert an AC power of the AC power supply into a DC power, a bridge rectifier circuit 100 electrically linked to the transformer circuit 99 for outputting the DC power, and a relay circuit 102 electrically coupled with the CPU 101 to selectively activate the heating element 21 for heating up the water within the water cavity 11.

Figure 2:
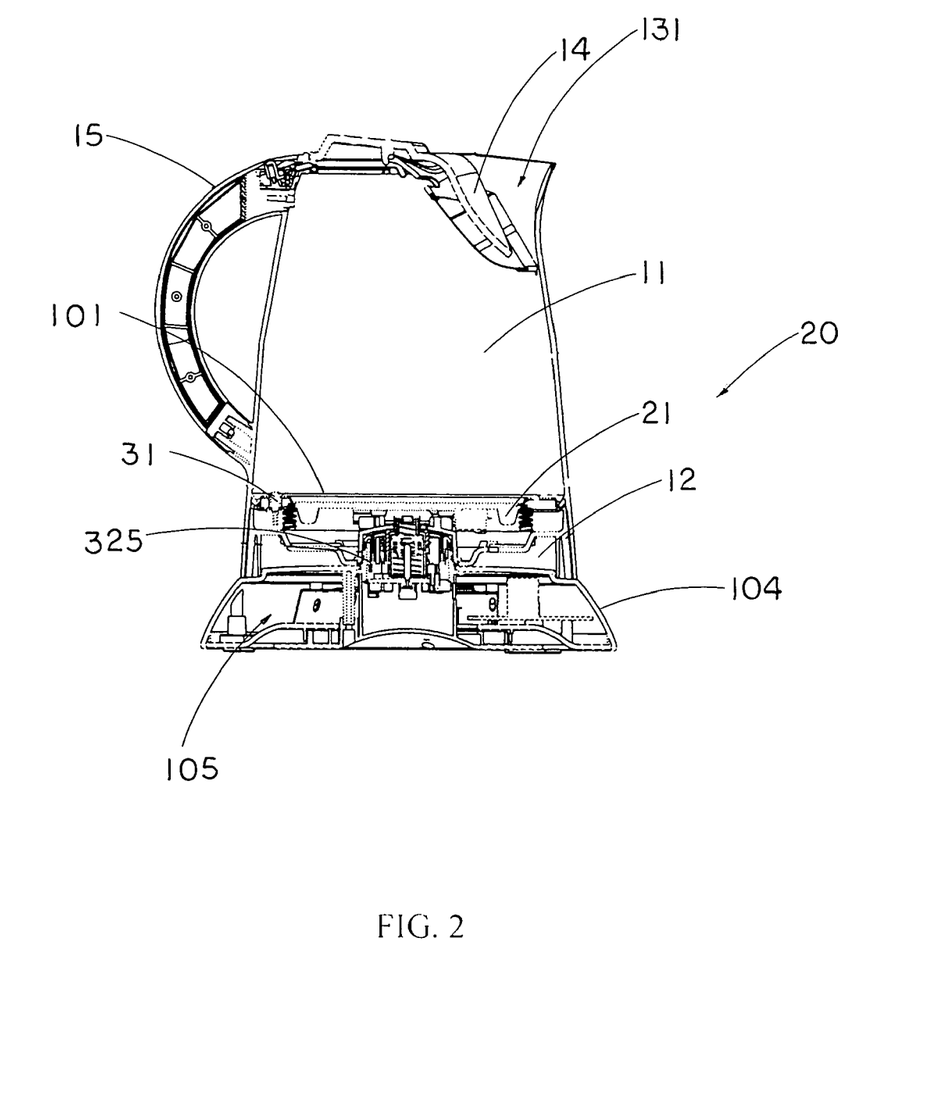
FIG. 2 is sectional view of the electrical water heater according to the above preferred embodiment of the present invention.
Figure 3:
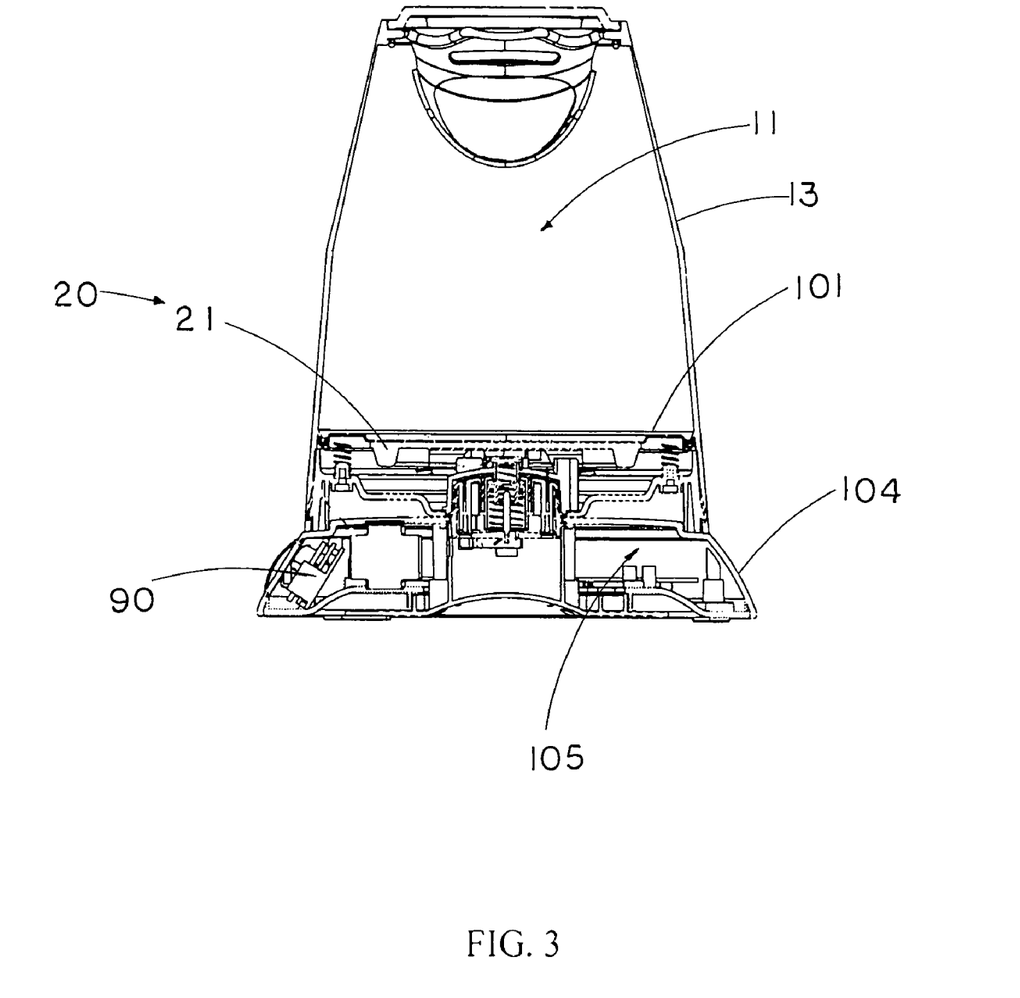
FIG. 3 is another sectional view of the electrical water heater according to the above preferred embodiment of the present invention.

Here, the CPU 101 is provided at a printed circuit board 90, wherein the thermal sensor 31 is electrically connected with the printed circuit board 90 via an electrical connector 325. As shown in FIG. 2 and FIG. 3, the electrical connector 325 is mounted to a bracket 40 which is securely attached to the electro-thermal plate 211 and well received within the base cavity 104. It is noted that the bracket 40 is mounted to the electro-thermal plate 211 by conventional fastening means, such as bolt and nut, screw, and so on. Furthermore, the relay circuit 102 comprises a switch controller 1021 mounted to the electro-thermal plate 211 too for ultimately managing the heating process of the electro-thermal plate 211. As a result, the relay circuit 102 is electrically coupled the water heater unit 20 for managing a heating process, whenever the CPU 101 output a signal indicating the temperature of the water not be matching the heat-up temperature set through the temperature adjustor 322, the relay switch controller 1021 is switched on/off for controlling the heating process of such water heater unit 20.

Further, the temperature adjustor 322 comprises a temperature setting switch 3221 electrically connected to the controlling circuit 321 to selectively input the heat-up temperature, a display screen 3222 provided on an outer wall of the container base 12 to display the heat-up temperature, and a temperature converting circuit electrically linked to the controlling circuit 321 for reciprocally converting the heat-up temperature indicated on the display screen 3222 between Fahrenheit mode and Celsius mode.

As shown in FIG. 1 and FIG. 4, the temperature adjuster 322 is embodied as a control panel provided at the bottom edge 104 of the container body 11 for facilitating the user' operation. Preferably, the display screen 3222 is embodied as a LED display unit and the temperature setting switch 3221 includes an adjustable knob to be ergonomically rotatable for a friendly operation.

The printed circuit board 90 is received within the base cavity 105 and a transformer 50 is attached onto the bottom cover 12 via transformer panel 51. It is worth to mention that a slot 121 is defined on the bottom cover 12 for permitting a winding spool 122 positioned therein, therefore, an electric wire 123 could be reeled onto the winding spool 122 in extractably manner. In case of the AC power supply 98 is away with the container body 10, the electric wire 123 could be unspooling from the winding spool 122 to obtain an optimal operational distance.

Figure 5:
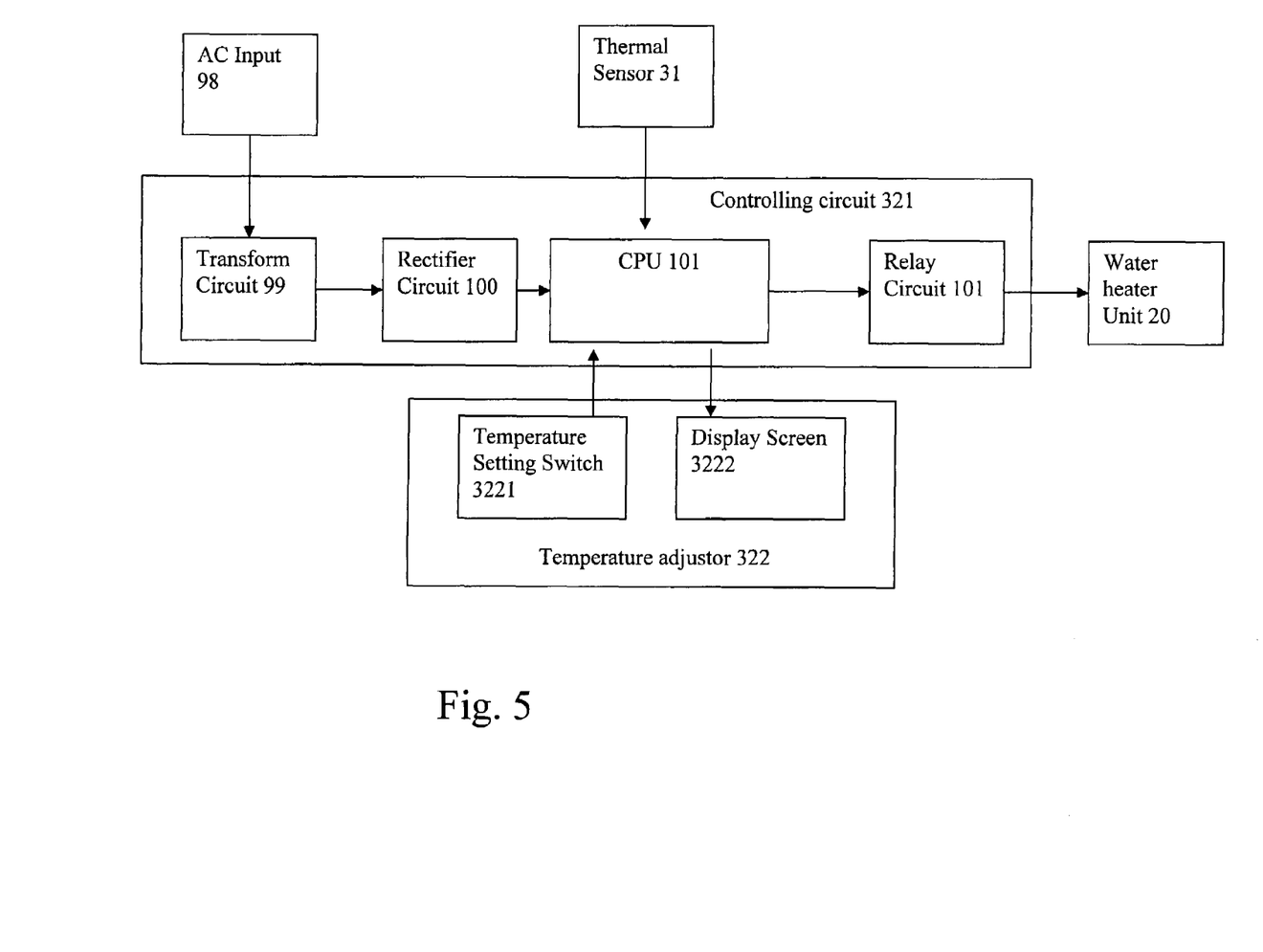
FIG. 5 is a flow chart showing the overall operating process of the electrical water heater according to the above preferred embodiment of the present invention.

Referring to FIG. 5, the controlling circuit flowing chart according to the preferred embodiment of the present is illustrated. The controlling circuit 321 comprises a rectified power supply for providing CPU 101, the relay circuit 102 as well as the temperature adjustor 322 a stabilizing AC power input, wherein the CPU 101 is adapted to compare the different temperature signals respectively from the thermal sensor 31 and the temperature adjustor 322 and to output an DC voltage control signal to the relay circuit so as to operating the water heater unit 20.

According to the present invention, the controlling circuit 321 is adapted to convert the water temperature detected by the thermal sensor 31 into a digital detecting signal and receives a digital inputting signal from the temperature adjuster 322 when the heat-up temperature is set, such that the controlling circuit 321 would compare the detecting signal with the inputting signal to generate a control signal to the water heater unit 20 so as to selectively activate the heating element 21.

Figure 6:
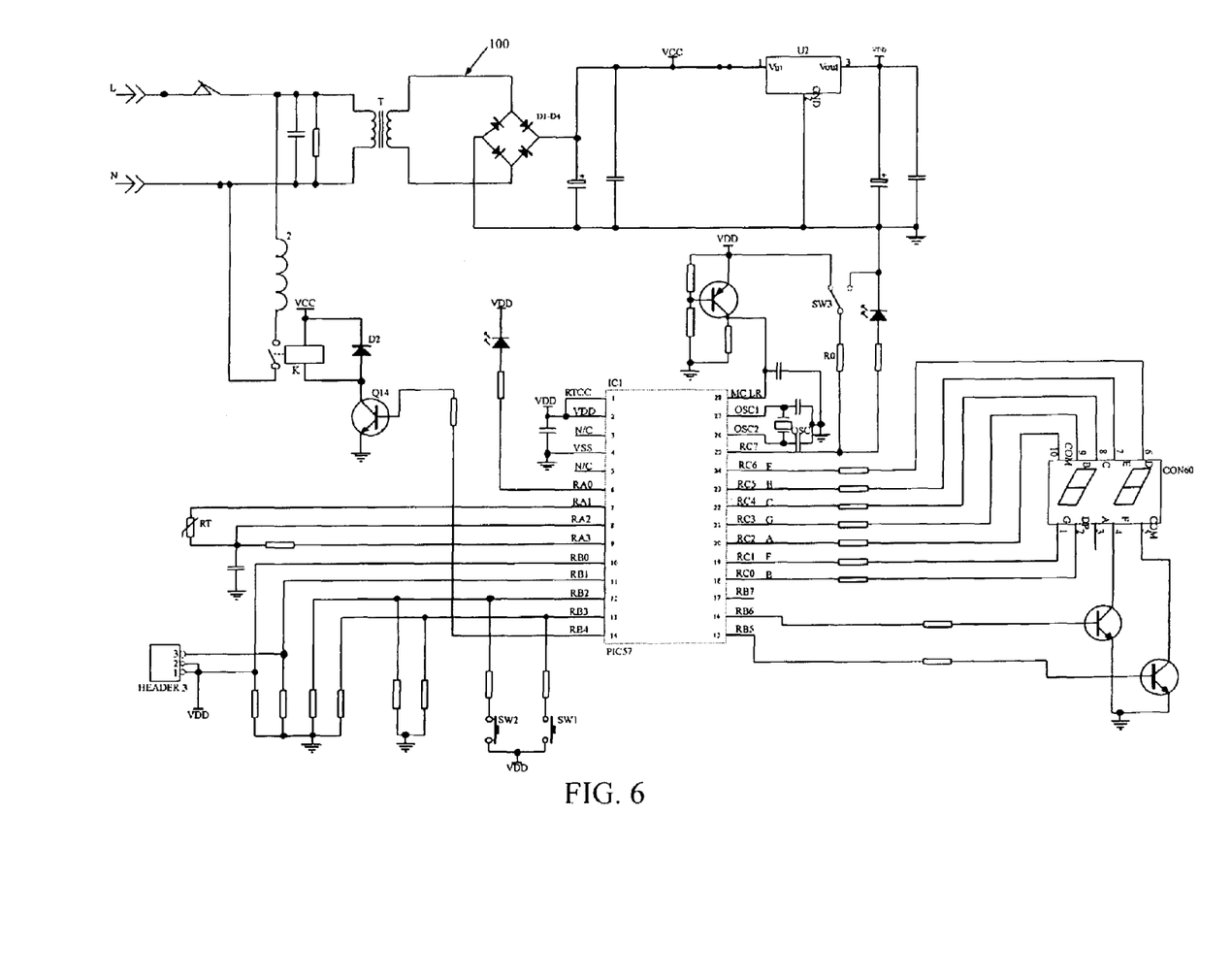
FIG. 6 is a circuit diagram of the electrical water heater according to the preferred embodiment of the present invention.

Referring to FIG. 6, the detailed circuit diagram of the water heater according to the preferred embodiment of the present invention is illustrated. The transformer circuit comprises a transformer T for lowering the voltage of the input AC, and the bridge rectifier circuit 100 consisting of diodes D1-D4 for outputting DC power supply VCC to a relay K. The rectifier circuit 100 further comprises a voltage regulator circuit U2, such as 78L05 for receiving the power supply VCC and outputting DC voltage VDD to the CPU and the LED display unit having light emitting diodes.

Preferably, the CPU 101, for example, is embodied as a PIC16C57 of 4.0 MHz, and of standby state when electrically powered. After the switch SW1/SW2 is turned on, a high voltage is generated from the pin RB2 or RB3 of the CPU 101, enabling the comparison of the temperature detected by the thermal sensor 31 with the heating temperature preset via the temperature adjustor 322. That is to say, after the push button provided on the temperature adjustor 322 is pressed, a preset temperature detecting and comparing program would be initiated.

Moreover, the thermistor RT of the thermal sensor 31 is electrically coupled with the pins RA1 and RA2 of the CPU. The temperature signal detected by the thermal sensor 31 would be compared by the CPU 101 to determine whether the temperature of the water being matched with a threshold value stored in the CPU 101. In case the detected temperature of the water is lower than the threshold value, i.e. the preset temperature set by the user, a high level signal would be outputted from the RB4 pin of the CPU 101 to the base of a triode Q14 so as to conduct the transistor Q14 for switching off the relay K. Therefore, the electrical power is then applied on the heating unit 20 through the relay K. Or otherwise, when the CPU detected that the water temperature is equal to or higher than the preset temperature, the pin RB4 of the CPU 331 would output a lower level signal to power off the heating unit 20.

It is noted that the thermal sensor 31 of the present invention is of an immersible mode, having a sensor probe 311 directly exposed to the water reserved in the water cavity 11. As a result, the resistance of the thermal resistor would be varying from time to time responsible to the variance of the water temperature. In other words, the constant variance of the resistance would alter the discharging speed of the electrical capacity C0. In short, the thermal sensor 31 is directly exposed to the water for ensuring the thermal resistor rather sensitive to the change of the water temperature. As a result, the controlling circuit 321 electrically coupled with such thermal sensor 31 could precisely control the power on/off of the heating unit 20 in an instant manner.

The temperature adjustor 322 comprises the adjustable knob 3221 for adjusting the input heat-up value. The adjustable knob is connected to a HEADER3 encoder for outputting encoded digital signals. As shown in FIG. 6, The HEADER3 encoder has Pin1 and Pin3 connected to pins RB1 and RB0 of the CPU 101 respectively. The CPU 101, upon receiving the digital signals output from the HEADER3 encoder, would alter the heat-up temperature stored therein, and output control signals via pins RC0-RC6 and RB5-RB6 to refresh the temperature value displayed on the LED display unit 311.

Therefore, the relay circuit 102 comprises the relay K, the triode Q14 and the diode D2. As shown in the FIG. 6, whenever a high level signal is outputted from the pin RB4 and applied to the base of triode Q14, the relay K would be switched on enabling the water heater unit 20 be powered and two electrodes of the diode D2 are connected respectively to the two ends of the winding of the relay K for protecting the relay K and improving the sensitivity of the relay K.

Preferably, the pin RC7 of the CPU 101 is connected to one end of the switch SW3 through a resistor R0, wherein the switch SW3 is correspondingly mated with two welding spots of the printed circuit board 90. According to the present invention, when the first welding spot is powered, the temperature shown on the display screen would be in Fahrenheit value, instead, if the second welding spot is grounded, the temperature shown on the display screen would be in Celsius value. Thus, the CPU is capable of controlling the display screen to display the temperature in an alternative mode. That is to say, Fahrenheit value would be displayed when the switch SW3 is connected to the ground, and Celsius value would be displayed when the switch SW3 is connected to the power supply VDD.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An electrical water heater for accurately heating a predetermined amount of water at a predetermined temperature, comprising:

a water container which comprises a container body having a water cavity adapted for containing said water therewithin, and a container base provided underneath said container body for supporting said container body;

a water heater unit provided in said container base to terminally communicate with said water within said water cavity, in such a manner that said water heater unit is adapted for heating up said water at said predetermined temperature in an accurately controllable manner;

a temperature control unit, which comprises:

a thermal sensor provided in said container base to accurately detect a temperature of said water within said water cavity, wherein said thermal sensor comprises:

a sensor probe supported in said water container to protrude into said water cavity in such a manner that a head portion of said sensor probe is arranged to physically contact with said water for sensitively and accurately detecting a temperature change of said water within said water cavity; and a temperature controller comprising a controlling circuit electrically communicated with said sensor probe, wherein said controlling circuit comprises a central processor unit for being selectively programmed to preset said predetermined temperature, a relay circuit electrically connected between said water heater unit and said central processor unit for selectively diverting an electrical current flowing between said water heater unit; and a bridge rectifier circuit electrically connecting said central processor unit and said relay circuit to external power source to provide an optimal electrical power for said central processor unit and said relay circuit, wherein when said water temperature detected by said sensor probe is below said predetermined temperature, said central processor unit is arranged to deactivate said relay circuit for allowing an electric current flowing through said water heater unit so as to heat up said water within said water cavity until said a temperature of said water reaches said predetermined temperature, and when said water temperature as detected by said sensor probe is above said heat-up temperature, said central processor unit is arranged to activate said relay circuit so as to cut off said electric current flowing through said water heater unit so as to stop heating up said water within said water cavity.

2. The electrical water heater, as recited in claim 1, wherein said relay circuit comprises a relay, a diode electrically connected with said relay, and a triode electrically connected with said diode and said central processor unit, in such a manner that when said central processor unit determines said water temperature is below said predetermined temperature, said central processor unit is arranged to feed a high electrical level to said triode so as to deactivate said relay for said water heater unit to electrically connect with said electric current for heating up said water within said water cavity.

3. The electrical water heater, as recited in claim 1, wherein said sensor probe of said thermal sensor has a rounded head portion protruded from said container base to physically contact with said water within said water cavity, and comprises a thermistor embedded within said sensor head portion to electrically connect with said central processor unit, wherein said temperature of said water within said water cavity is arranged to be accurately and sensitively converted into a corresponding electrical signal of said thermistor and transmitted to said central processor unit for said central processor unit to compare a detected temperature with said predetermined temperature in a real-time basis.

4. The electrical water heater, as recited in claim 2, wherein said sensor probe of said thermal sensor has a rounded head portion protruded from said container base to physically contact with said water within said water cavity, and comprises a thermistor embedded within said sensor head portion to electrically connect with said central processor unit, wherein said temperature of said water within said water cavity is arranged to be accurately and sensitively converted into a corresponding electrical signal of said thermistor and transmitted to said central processor unit for said central processor unit to compare a detected temperature with said predetermined temperature in a real-time basis.

5. The electrical water heater, as recited in claim 3, wherein said temperature controller further comprises a temperature adjustor comprising a temperature setting switch electrically connected to said controlling circuit to selectively input said predetermined water temperature to be pre-programmed into said central processor unit, so that said central processor unit is adapted to timely activate said relay circuit for heating up said water within said water cavity when said water temperature is below said predetermined temperature.

6. The electrical water heater, as recited in claim 4, wherein said temperature controller further comprises a temperature adjustor comprising a temperature setting switch electrically connected to said controlling circuit to selectively input said predetermined water temperature to be pre-programmed into said central processor unit, so that said central processor unit is adapted to timely activate said relay circuit for heating up said water within said water cavity when said water temperature is below said predetermined temperature.

7. The electrical water heater, as recited in claim 1, wherein said water heater unit comprises an electro-thermal plate sealedly mounted between said container base and a bottom wall of said container body which is made of thermal conductive material, such that when said electro-thermal plate is activated by said controlling circuit, said electro-thermal plate generates heat through said bottom wall of said container body for heating up said water within said water cavity.

8. The electrical water heater, as recited in claim 5, wherein said water heater unit comprises an electro-thermal plate sealedly mounted between said container base and a bottom wall of said container body which is made of thermal conductive material, such that when said electro-thermal plate is activated by said controlling circuit, said electro-thermal plate generates heat through said bottom wall of said container body for heating up said water within said water cavity.

9. The electrical water heater, as recited in claim 6, wherein said water heater unit comprises an electro-thermal plate sealedly mounted between said container base and a bottom wall of said container body which is made of thermal conductive material, such that when said electro-thermal plate is activated by said controlling circuit, said electro-thermal plate generates heat through said bottom wall of said container body for heating up said water within said water cavity.

10. The electrical water heater, as recited in claim 7, wherein aid temperature adjustor further comprises a display screen electrically connected with said central processor unit and provided on an outer wall of said container base for displaying said predetermined temperature and said temperature of said water within said water cavity in a predetermined temperature scale.

11. The electrical water heater, as recited in claim 8, wherein aid temperature adjustor further comprises a display screen electrically connected with said central processor unit and provided on an outer wall of said container base for displaying said predetermined temperature and said temperature of said water within said water cavity in a predetermined temperature scale.

12. The electrical water heater, as recited in claim 9, wherein aid temperature adjustor further comprises a display screen electrically connected with said central processor unit and provided on an outer wall of said container base for displaying said predetermined temperature and said temperature of said water within said water cavity in a predetermined temperature scale.

13. The electrical water heater, as recited in claim 10, wherein said thermal sensor further comprises a sensor gasket provided on a bottom wall of said container body, wherein said sensor probe is arranged to be embedded by said sensor gasket so as to protect said sensor probe and sealingly demarcate said container body with said container base for preventing water leakage between said container body and said container base.

14. The electrical water heater, as recited in claim 11, wherein said thermal sensor further comprises a sensor gasket provided on a bottom wall of said container body, wherein said sensor probe is arranged to be embedded by said sensor gasket so as to protect said sensor probe and sealingly demarcate said container body with said container base for preventing water leakage between said container body and said container base.

15. The electrical water heater, as recited in claim 12, wherein said thermal sensor further comprises a sensor gasket provided on a bottom wall of said container body, wherein said sensor probe is arranged to be embedded by said sensor gasket so as to protect said sensor probe and sealingly demarcate said container body with said container base for preventing water leakage between said container body and said container base.

16. The electrical water heater, as recited in claim 13, wherein said water container further comprises an outer insulating casing integrally extended from said container base to sealedly enclose said container body in a heat insulating manner, wherein said insulating casing has a top opening communicating with said water cavity and a water filter provided at said top opening for filtering said water to be heated within said water cavity.

17. The electrical water heater, as recited in claim 14, wherein said water container further comprises an outer insulating casing integrally extended from said container base to sealedly enclose said container body in a heat insulating manner, wherein said insulating casing has a top opening communicating with said water cavity and a water filter provided at said top opening for filtering said water to be heated within said water cavity.

18. The electrical water heater, as recited in claim 15, wherein said water container further comprises an outer insulating casing integrally extended from said container base to sealedly enclose said container body in a heat insulating manner, wherein said insulating casing has a top opening communicating with said water cavity and a water filter provided at said top opening for filtering said water to be heated within said water cavity.

19. The electrical water heater, as recited in claim 17, wherein said container base further has a storage cavity and comprises an extractable extension cord which is electrically extended from said controlling circuit and is adapted to be wound up within said storage cavity.

20. The electrical water heater, as recited in claim 18, wherein said container base further has a storage cavity and comprises an extractable extension cord which is electrically extended from said controlling circuit and is adapted to be wound up within said storage cavity.

* * * * *